United States Patent
Jiang et al.

(10) Patent No.: US 9,979,948 B2
(45) Date of Patent: May 22, 2018

(54) METHOD AND APPARATUS FOR COMPRESSING TEXTURE INFORMATION OF THREE-DIMENSIONAL (3D) MODELS

(71) Applicant: THOMSON LICENSING, Issy de Moulineaux (FR)

(72) Inventors: Wenfei Jiang, Beijing (CN); Jiang Tian, Beijing (CN); Kangying Cai, Beijing (CN); Tao Luo, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 108 days.

(21) Appl. No.: 14/370,100

(22) PCT Filed: Dec. 29, 2012

(86) PCT No.: PCT/CN2012/087935
§ 371 (c)(1),
(2) Date: Jul. 1, 2014

(87) PCT Pub. No.: WO2013/107273
PCT Pub. Date: Jul. 25, 2013

(65) Prior Publication Data
US 2014/0334717 A1 Nov. 13, 2014

(30) Foreign Application Priority Data

Jan. 21, 2012 (WO) ................ PCT/CN2012/070703
Apr. 19, 2012 (WO) ................ PCT/CN2012/074356

(51) Int. Cl.
*H04N 19/23* (2014.01)
*H04N 13/00* (2006.01)
(Continued)

(52) U.S. Cl.
CPC ......... *H04N 13/0048* (2013.01); *G06T 9/001* (2013.01); *G06T 15/04* (2013.01); *H04N 19/23* (2014.11)

(58) Field of Classification Search
CPC .... H04N 19/23; H04N 13/00; H04N 13/0048; H04N 19/004; G06T 9/001; G06T 15/04
(Continued)

(56) References Cited

U.S. PATENT DOCUMENTS 6,148,026 A * 11/2000 Puri ................. H04N 19/29
375/240
6,668,091 B1 12/2003 Kim et al.
(Continued)

FOREIGN PATENT DOCUMENTS

| CN | 101626509 | 1/2010 |
| JP | 1998023406 A | 1/1998 |

(Continued)

OTHER PUBLICATIONS

CN 101626509A (Machine Translation on Apr. 6, 2016).*
(Continued)

*Primary Examiner* — Yuehan Wang
*Assistant Examiner* — Michael Le
(74) *Attorney, Agent, or Firm* — Meagher Emanuel Laks Goldberg & Liao, LLP

(57) ABSTRACT

A 3D model can be modeled using "pattern-instance?representation. To describe the vertices and triangles, properties of the instance, for example, texture, color, and normal, are adjusted to correspond to the order in the pattern. The texture of an instance is encoded depending on its similarity with the texture of a corresponding pattern. When instance texture is identical or almost identical to the pattern texture, the instance texture is not encoded and the pattern texture will be used to reconstruct the instance texture. When the (Continued)

instance texture is similar to the pattern texture, the instance texture is predictively encoded from the pattern texture, that is, the difference between the instance texture and pattern texture is encoded, and the instance texture is determined as a combination of the pattern texture and the difference.

17 Claims, 14 Drawing Sheets

(51) Int. Cl.
      *G06T 15/04*        (2011.01)
      *G06T 9/00*        (2006.01)

(58) Field of Classification Search
      USPC .................................. 345/420, 422; 382/154
      See application file for complete search history.

(56) References Cited

U.S. PATENT DOCUMENTS

| | | | |
|---|---|---|---|
| 2001/0028744 A1* | 10/2001 | Han | G06T 17/20 |
| | | | 382/232 |
| 2005/0243086 A1 | 11/2005 | Schechter et al. | |
| 2007/0160306 A1* | 7/2007 | Ahn | H04N 19/70 |
| | | | 382/245 |
| 2008/0170795 A1 | 7/2008 | Akenine-Moller et al. | |
| 2009/0263029 A1 | 10/2009 | Chang et al. | |
| 2011/0206120 A1 | 8/2011 | Dumitras et al. | |
| 2012/0002891 A1 | 1/2012 | Ahn et al. | |
| 2012/0106858 A1* | 5/2012 | Cai | G06T 9/004 |
| | | | 382/225 |
| 2013/0106834 A1* | 5/2013 | Curington | G06T 9/00 |
| | | | 345/419 |

FOREIGN PATENT DOCUMENTS

| | | |
|---|---|---|
| JP | 2001312741 A | 11/2001 |
| JP | 2006187015 A | 7/2006 |
| JP | 2007536621 A | 12/2007 |
| JP | 2008538435 A | 10/2008 |
| WO | WO2010149492 | 12/2010 |
| WO | WO2011044713 | 4/2011 |
| WO | WO2011088595 | 7/2011 |
| WO | WO2012000132 | 1/2012 |

OTHER PUBLICATIONS

Kangying Cai; Exploiting repeated patterns for efficient compression of massive models; Proceeding VRCAI '09 Proceedings of the 8th International Conference on Virtual Reality Continuum and its Applications in Industry; 2009; pp. 145-150.*

SP Mudur, D Shikhare; 3D Compression of Engineering Models for Cooperative Computing Applications; Int'l Conf. on Infrastructure for E-Business, 2002.*

Search Report dated Mar. 28, 2013.

Gevers,"Image Segmentation and Similarity of Color-Texture Objects", IEEE Transactions on Multimedia, vol. 4, No. 4, Dec. 2002, pp. 509-516.

Suzuki et al., "A similarity retrieval technique for textured 3D models", 2010 International Conference on Information Retrieval & Knowledge Management, Mar. 17-18, 2010, Shah Alam, Selangor, Malaysia.

Suzuki et al., "A Texture Similarity Evaluation Method for 3D Models", Proceedings of the Ninth IASTED International Conference on Internet and Multimedia Systems and Applications (IMSA 2005), Aug. 15-17, 2005, Honolulu, Hawaii, USA., pp. 185-190.

* cited by examiner

METHOD AND APPARATUS FOR COMPRESSING TEXTURE INFORMATION OF THREE-DIMENSIONAL (3D) MODELS

RELATED APPLICATIONS

This application claims the benefit, under 35 U.S.C. § 365 of International Application PCT/CN2012/087935 filed Dec. 29, 2012 and claims priority to PCT/CN/2012/070703, filed Jan. 21, 2012 and PCT/CN2012/074356 filed Apr. 19, 2012 which was published in accordance with PCT Article 21(2) on Jul. 25, 2013 in English.

TECHNICAL FIELD

This invention relates to a method and apparatus for generating a bitstream representative of a 3D model, and a method and apparatus for decoding the same.

BACKGROUND

In practical applications, many 3D models consist of a large number of connected components. These multi-component 3D models usually contain many repetitive structures in various transformations, as shown in FIG. 1.

Compression algorithms for multi-component 3D models that take advantage of repetitive structures in the input models are known. Repetitive structures of a 3D model are discovered in various positions, orientations, and scaling factors. The 3D model is then organized into "pattern-instance" representation. A pattern is used to denote a representative geometry of the corresponding repetitive structure. Components belonging to a repetitive structure are denoted as instances of the corresponding pattern and may be represented by a pattern ID and transformation information, for example, reflection, translation, rotation and possible scaling with respect to the pattern. The instance transformation information may be organized into, for example, reflection part, translation part, rotation part, and possible scaling part. There might be some components of the 3D models that are not repetitive, which are referred to as unique components.

A commonly owned PCT application, entitled "Efficient compression scheme for large 3D engineering models" by K. Cai, Y. Jin, and Z. Chen (PCT/EP10/058048), the teachings of which are specifically incorporated herein by reference, discloses a compression method for 3D models that have geometric features which repeat in various positions, scales and orientations.

Another commonly owned PCT application, entitled "Bitstream syntax and semantics of repetitive structure discovery based 3D model compression algorithm" by K. Cai, W. Jiang, and J. Tian (PCT/CN2011/076991), the teachings of which are specifically incorporated herein by reference, discloses two modes for compressing instance transformation information.

Another commonly owned PCT application, entitled "Method and apparatus for generating a bitstream of repetitive structure discovery based 3D model compression" by K. Cai, W. Jiang, and J. Tian (PCT/CN2011/082942), the teachings of which are specifically incorporated herein by reference, discloses two instance compression modes, namely, an elementary instance data mode and a grouped instance data mode.

Another commonly owned PCT application, entitled "System and method for error controllable repetitive structure discovery based compression" by K. Cai, W. Jiang, and T. Luo (PCT/CN2012/070877), the teachings of which are specifically incorporated herein by reference, discloses a method and an apparatus for identifying repetitive structures in 3D models to reduce redundancy among instance components, and thus to improve compression efficiency.

SUMMARY

The present principles provide a method for decoding a bitstream representing a 3D model, comprising the steps of: determining from the bitstream whether an instance of a pattern uses a property of the pattern, the pattern being associated with a structure of the 3D model and the instance being represented as a transformation of the pattern; and determining a property of the instance in response to the property of the pattern, wherein the property of the instance corresponds to one of texture, texture coordinate, color, and normal as described below. The present principles also provide an apparatus for performing these steps.

The present principles also provide a method for generating a bitstream representing a 3D model, comprising the steps of: accessing an instance of a pattern, the pattern being associated with a structure of the 3D model and the instance being represented as a transformation of the pattern; and indicating in the bitstream whether a property of the instance is encoded using a property of the pattern, wherein the property of the instance corresponds to one of texture, texture coordinate, color, and normal as described below. The present principles also provide an apparatus for performing these steps.

The present principles also provide a method for generating a bitstream representing a 3D model, comprising the steps of: determining an order of vertices in a first face in a pattern associated with a structure; accessing a plurality of property sets, wherein each property set of the plurality of property sets is associated with a corresponding vertex in a second face in an instance of the pattern; and ordering the plurality of property sets in response to the determined order as described below. The present principles also provide an apparatus for performing these steps.

The present principles also provide a computer readable storage medium having stored thereon instructions for generating or decoding a bitstream, according to the methods described above.

The present principles also provide a computer readable storage medium having stored a bitstream generated according to the methods described above.

DETAILED DESCRIPTION

Figure 1:
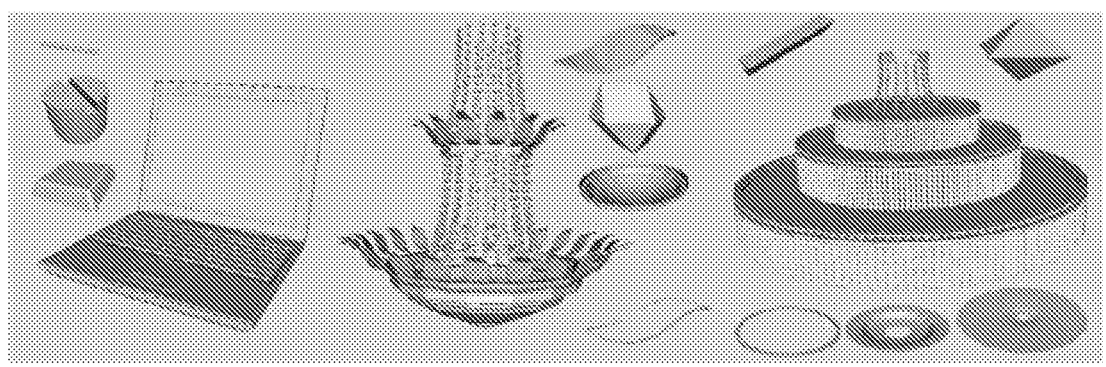
FIG. 1 shows exemplary 3D models with a large number of components and repetitive structures.

As shown in FIG. 1, there may be many repetitive structures in 3D models. To efficiently encode the 3D models, the repetitive structures may be organized into patterns and instances, wherein an instance is represented as a transformation of a corresponding pattern, for example, using a pattern ID of the corresponding pattern and a transformation matrix which contains information on translation, rotation, and scaling.

When an instance is represented by a pattern ID and a transformation matrix, the pattern ID and the transformation matrix are to be compressed when compressing the instance. Consequently, an instance may be reconstructed through the pattern ID and the decoded transformation matrix, that is, an instance may be reconstructed as transformation (from the decoded transformation matrix) of a decoded pattern indexed by the pattern ID.

To represent a textured 3D model, one or more texture images may be transmitted together with the geometry. Each face of the 3D model corresponds to a certain area of the texture image(s). The corresponding coordinates in the texture image(s) for each vertex is encoded to represent the mapping relationship.

Since encoding texture usually uses much more bits than encoding geometry and connectivity of 3D models, it is preferred to have texture information efficiently compressed. The present principles provide a method and apparatus for efficiently compressing texture information of 3D models by utilizing the redundancy between repetitive textures.

Figure 2A:
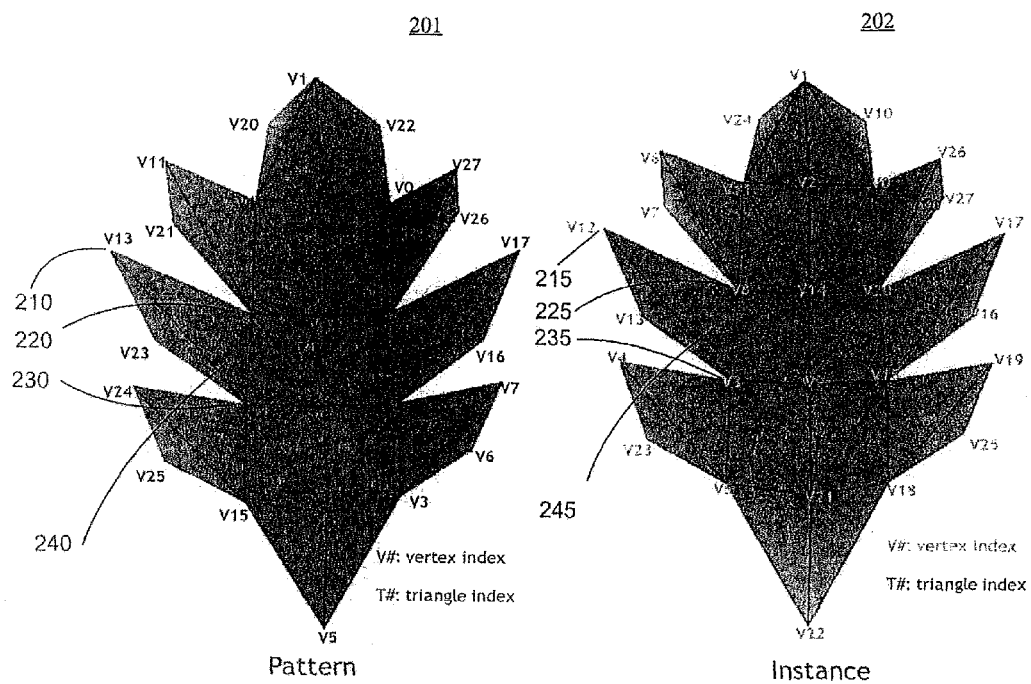
FIG. 2A is a pictorial example depicting a pattern and an instance.
Figure 2B:
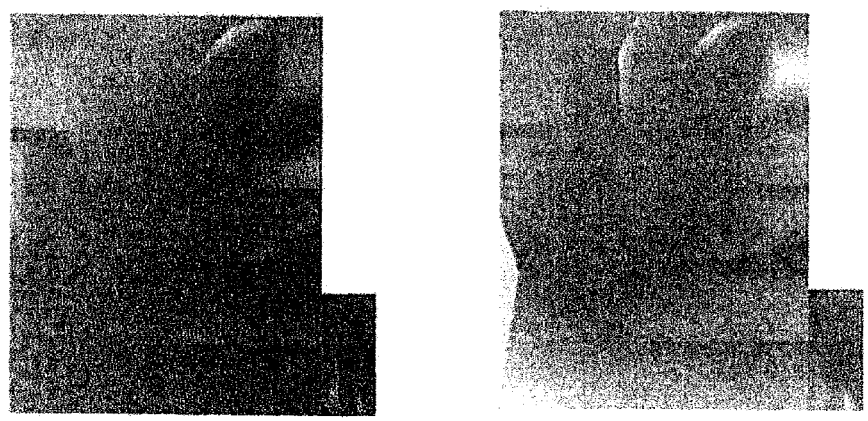
FIG. 2B is a pictorial example depicting texture images for the pattern and instance.

FIG. 2A illustrates an exemplary pattern 201 and an exemplary instance 202. Each vertex or face is indicated by an index. For example, face 240 in the pattern is indicated by an index T6, and its three vertices are indicated by indices V13, V12, and V14. A corresponding face 245 in the instance is indicated by an index T20, and its three vertices are indicated by indices V12, V8, and V3. We denote that a face or vertex in the pattern corresponds to a face or vertex in the instance, or vice versa, when they substantially overlap each other when the pattern and instance are aligned. Note that the indices for corresponding faces or vertices are different for the pattern and instance. FIG. 2B illustrates exemplary texture images 203 and 204 for pattern 201 and instance 202 respectively.

A 3D model can be represented by a vertex table (V0, V1, V2, . . . ) consisting of all vertex coordinates and a triangle table (T0, T1, T2, . . . ) consisting of all triangles' vertex indices in the vertex table. Moreover, each vertex and triangle could have one or more properties, such as normal, color, and texture coordinate. Those vertex properties and triangle properties may be attached to vertices and triangles in the corresponding table or may be stored in additional vertex/triangle property tables following the same vertex/triangle order in the vertex/triangle table.

TABLE 1 illustrates an exemplary 3D mesh file that contains definitions for vertices, texture coordinates, normals, and faces.

TABLE 1

List of Vertices, with (x,y,z[,w]) coordinates, w is optional.
v 0.123 0.234 0.345 1.0
v ...
...
Texture coordinates, in (u,v[,w]) coordinates, w is optional.
vt 0.500 −1.352 [0.234]
vt ...
...
Normals in (x,y,z) form; normals might not be unit.
vn 0.707 0.000 0.707
vn ...
...
Face Definitions
f 6/4/1 3/5/3 7/6/5
f ...
...

As shown in TABLE 1, texture coordinate indices can be used to specify texture coordinates when defining a face. In the block of face definitions, the format is vertex index/texture coordinate index/normal index. When a triangle is used to represent a face, each face has a three-tuple of texture coordinate indices. All these tuples form a list.

Correspondence between a pattern and instance may be based on one-to-one vertex correspondence, which can be built by a nearest neighbor searching algorithm such as KD-tree searching. When the properties of instance vertices and triangles are also to be compressed based on repetitive structures, the correspondence between triangles should also be considered.

Figure 3A:
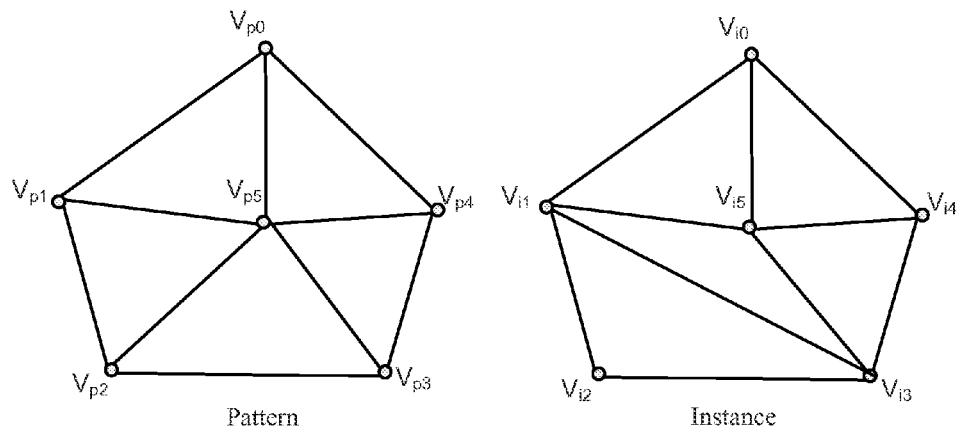
FIG. 3A is a pictorial example depicting a one-to-one correspondence between instance vertices and pattern vertices without a one-to-one correspondence between instance triangles and pattern triangles.

In one example as shown in FIG. 3A, there is one-to-one correspondence between instance vertices and pattern vertices ($V_{pi}$ corresponds to $V_{ii}$). However, there is no one-to-one correspondence between instance triangles and pattern triangles. Without correspondence between triangles, it may be difficult to compress instance triangle properties based on pattern properties.

Figure 3B:
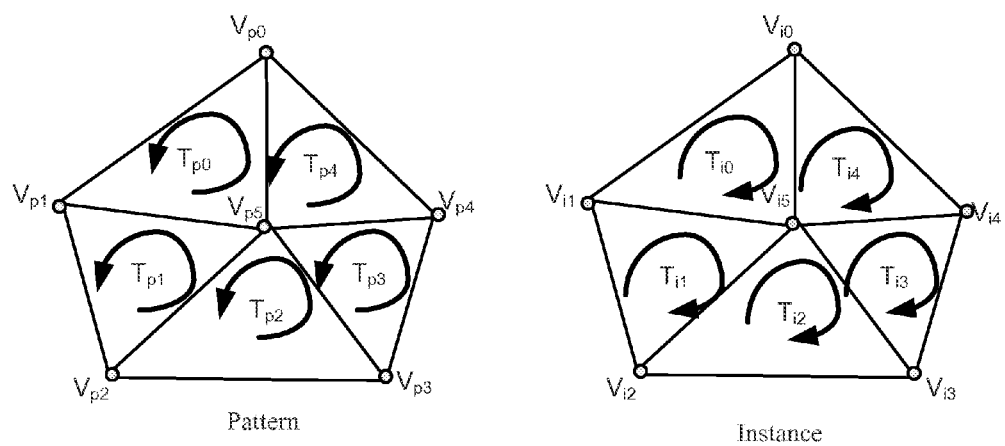
FIG. 3B is a pictorial example depicting that an instance is flipped with respect to a pattern.

Thus, besides one-to-one vertex correspondence between instances and corresponding patterns, one instance should also have one-to-one triangle correspondence with the corresponding pattern, which is consistent with the one-to-one vertex correspondence. All triangles of one instance could have opposite normals with their corresponding pattern after the pattern has been aligned with the instance component, which means the instance and pattern are flipped with respect to each other. As shown in FIG. 3B, triangle $T_{pi}$ corresponds to $T_{ii}$, however, $T_{pi}$ and $T_{ii}$ have different orientations (i.e., opposite normals).

As a pattern and instances correspond to repetitive structures, it may be possible to re-use the geometry of pattern to encode geometry information of instances. In the present embodiments, we further explore the similarity between other properties, for example, but not limited to, texture and normal. In order to remove the redundancy between the pattern and instances, we may pre-process the representation of the instances before we encode the instances.

Figure 4:
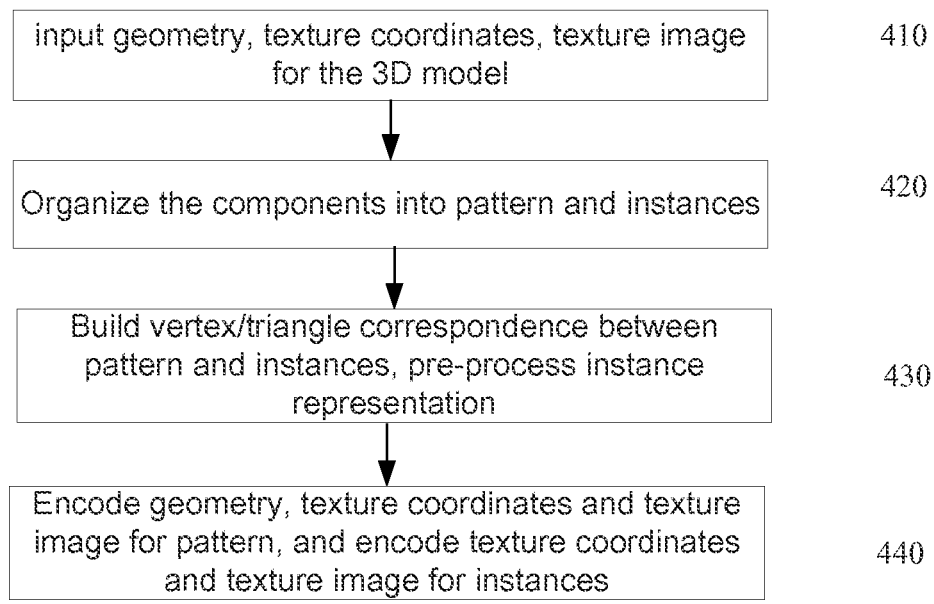
FIG. 4 is a flow diagram depicting an example for encoding 3D models, in accordance with an embodiment of the present principles.

FIG. 4 shows an exemplary method 400 for encoding a 3D model. In method 400, the 3D model data (e.g., geometry, texture coordinate, and texture image) is input at step 410. At step 420, components within the 3D model are organized into patterns and instances. At step 425, it builds vertex and triangle correspondences between patterns and instances and pre-processes the representation of instance components. Subsequently, at step 430, the 3D model is encoded. Specifically, the properties of patterns may be re-used for encoding the instances.

In the following, the steps of pre-processing (430) and encoding (440) are described in further detail.

Pre-Processing

TABLE 2

| Vertex | | Triangle | |
|---|---|---|---|
| Pattern | Instance | Pattern | Instance |
| 0 | 0 | 0 | 0 |
| 1 | 1 | 1 | 12 |
| 2 | 2 | 2 | 23 |
| 3 | 18 | 3 | 21 |
| 4 | 21 | 4 | 5 |
| 5 | 22 | 5 | 24 |
| 6 | 25 | 6 | 20 |
| 7 | 19 | 7 | 18 |
| 8 | 15 | 8 | 8 |
| 9 | 9 | 9 | 22 |
| 10 | 11 | 10 | 17 |
| 11 | 6 | 11 | 2 |
| 12 | 8 | 12 | 15 |
| 13 | 12 | 13 | 4 |
| 14 | 3 | 14 | 6 |
| 15 | 5 | 15 | 25 |
| 16 | 16 | 16 | 3 |
| 17 | 17 | 17 | 1 |
| 18 | 20 | 18 | 16 |
| 19 | 14 | 19 | 14 |
| 20 | 24 | 20 | 27 |
| 21 | 7 | 21 | 11 |
| 22 | 10 | 22 | 19 |
| 23 | 13 | 23 | 26 |
| 24 | 4 | 24 | 9 |
| 25 | 23 | 25 | 7 |
| 26 | 27 | 26 | 10 |
| 27 | 26 | 27 | 13 |
| | | 28 | 29 |
| | | 29 | 28 |

TABLE 2 shows the correspondence between vertices and triangles between pattern 201 and instance 202, both shown in FIG. 2A. That is, even if a pattern and instance correspond to similar structure, their representations in 3D mesh files are different.

To encode an instance's texture, in one embodiment, based on a pattern's geometry, a new texture image can be generated by re-arranging the corresponding triangles in the instance's initial texture image. During this re-arrangement, the pattern's texture coordinates will be used. That is, the mapping is derived from the transformation from the instance's texture coordinates to the pattern's texture coordinates. Consequently, the instance may be able to use the texture related data from the pattern except the texture image.

In another embodiment, we process texture coordinates and indices without generating a new texture image. The texture coordinates may first be re-ordered according to the vertex and triangle orders of the pattern. Once repetitive structure based on purely geometrical information has been identified, this information could be used to process the texture data.

Figure 5A:
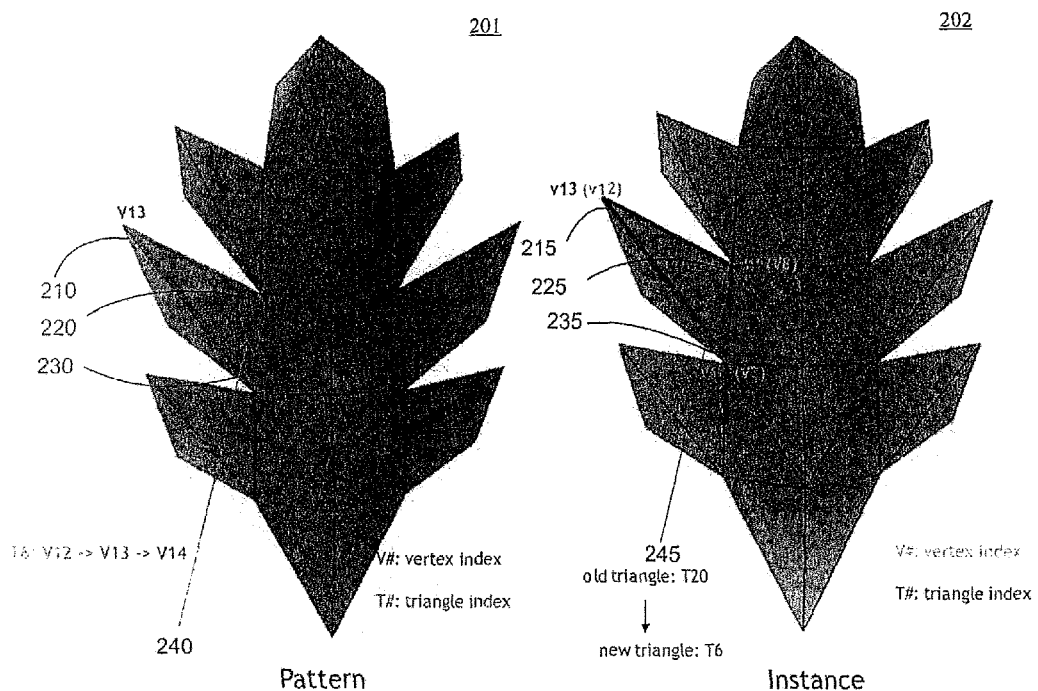
FIG. 5A is another pictorial example depicting a pattern and an instance.
Figure 5B:
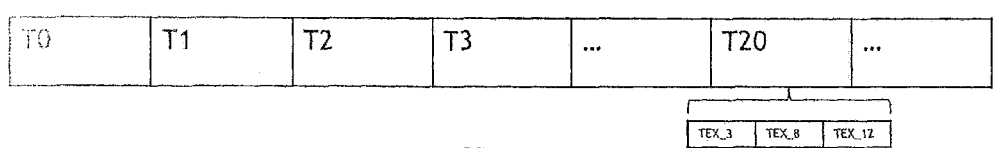
FIG. 5B is a list of texture coordinates for the instance before adjusting.
Figure 5C:
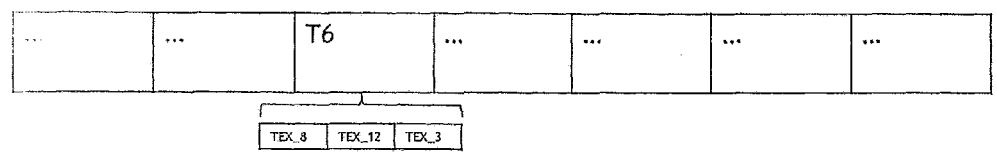
FIG. 5C is a list of texture coordinates for the instance after adjusting, in accordance with an embodiment of the present principles.

An example of re-ordering is illustrated in FIGS. 5A-5C. First, the vertex correspondence between pattern and instance may be identified, for example, by nearest neighbor search. Once we know the vertex correspondence, the triangle correspondence may be obtained. Then, we run this procedure for all the vertices and triangles and obtain the correspondence table as shown in TABLE 2. Note that the vertex correspondence and the triangle correspondence need to be one-to-one. For example, vertex 210 (vertex index V13) in pattern 201 corresponds to vertex 215 (vertex index V12) in instance 202, and face/triangle 240 (face index T6) in the pattern corresponds to face/triangle 245 (face index T20) in the instance. In one exemplary embodiment, face T6 in the pattern is described as T6: V12/TEX_12 V13/TEX_13 V14/TEX_14, and face T20 in the instance is described as T20: V3/TEX_3 V8/TEX_8 V12/TEX_12. Note that the vertex index/texture coordinate index is used to represent the face here (i.e., normal index is not shown).

FIGS. 5B and 5C illustrates exemplary texture coordinates before and after adjusting, respectively. Before adjusting, the face definitions for the instance are based on the vertex indices and triangles indices of the instance. After adjusting, the instance uses corresponding pattern's vertex indices and triangles' order. Consequently, T20: V3/TEX_3 V8/TEX_8 V12/TEX_12 will be changed into T6: V12/TEX_8 V13/TEX_12 V14/TEX_3. Thus, the texture coordinates for face 245 in the instance becomes from TEX_3, TEX_8, TEX_12 (as illustrated in FIG. 5B) to TEX_8, TEX_12, TEX_3 (as illustrated in FIG. 5C). When other properties, such as colors and normals are considered, they also need to be re-ordered a similar fashion.

Encoding

After pre-processing, the property (e.g., texture, normal) of the pattern can be used to efficiently encode the instance property. In one embodiment, the present principles examine the similarity between textures of a pattern and an instance. If the texture coordinates of the pattern and the instance are identical, that is, the instance uses the same texture as the pattern, no texture is to be encoded for the instance. Rather, a flag is written into the bitstream to inform the decoder to copy the texture of the pattern when reconstructing the instance. If the texture coordinates of the pattern and the instances are different, contents of corresponding areas in texture images are compared between the pattern and the instance. If the contents are different, the texture coordinate of the instance is encoded. If the contents are identical or almost identical, the region corresponding to the instance is removed from the texture images, and the decoder copies the texture of the pattern when reconstructing the instance.

If the contents are similar to some extent, a difference image between the pattern and the instance is generated, the region corresponding to the instance in the texture images is replaced with the difference image, and a flag is written into the bitstream to inform the decoder to generate the texture for the instance by adding the difference image to the instance texture. Consequently, the texture of an instance is predictively encoded from the texture of the pattern to exploit the redundancy of the texture image.

In addition to texture property, other properties, for example, but not limited to, normals and colors, of an instance may be identical or similar to the corresponding pattern properties. Similar to texture, these properties of the instance can be predicted from the properties of the pattern, and the prediction errors instead of the properties are encoded. In the following, we use texture as an example to illustrate how we can use the similarity between a pattern and instance when encoding the instance.

To efficiently encode the texture property, four texture coding modes are defined for texture representation:

Mode 1: The texture coordinates of the pattern and the instance are identical. In this mode, neither the texture coordinates nor the texture content of the instance is coded.

Mode 2: The texture coordinates of the pattern and the instance are different and the content of the textures are identical or almost identical. In this mode, the texture coordinates of the instance are coded but the texture content is skipped.

Mode 3: The texture coordinates of the pattern and the instance are different and the content of the textures are similar. In this mode, the texture coordinates of the instance are coded and the texture difference between the pattern and the instance is coded. Consequently, compression benefits from predicting the instance texture from the pattern texture.

Mode 4: The texture coordinates of the pattern and the instance, and the content of the texture, are different. In this mode, the texture coordinates and the texture content of the instance are coded normally.

Figures 6A, 6B:
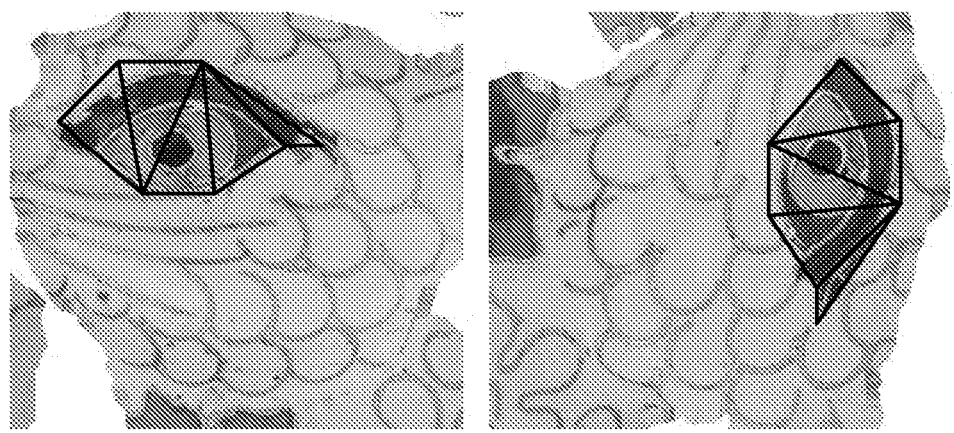
FIGS. 6A and 6B are pictorial examples depicting two portions of a texture image for a 3D model.

FIGS. 6A and 6B show portions of a texture image for a 3D model that corresponds to an eye of a bunny. The eye in FIG. 6A is quite similar to the eye in FIG. 6B and it is possible to use one eye to represent the other. For illustration purposes, we suppose that these two eyes belong to two components A and B, wherein component B is an instance of the pattern A, and the problem is to decide whether texture of B can be represented by texture of A.

To determine whether and how texture of B can be represented by texture of A, instead of comparing all the textures on the surfaces of the components, we compare the textures in unit of patch. A patch is a region in the texture image that corresponds to a set of adjacent triangles on the 3D model. It may contain one or more triangles of the component. Exactly how many triangles are in a patch may depend on the input 3D model.

Figure 7:
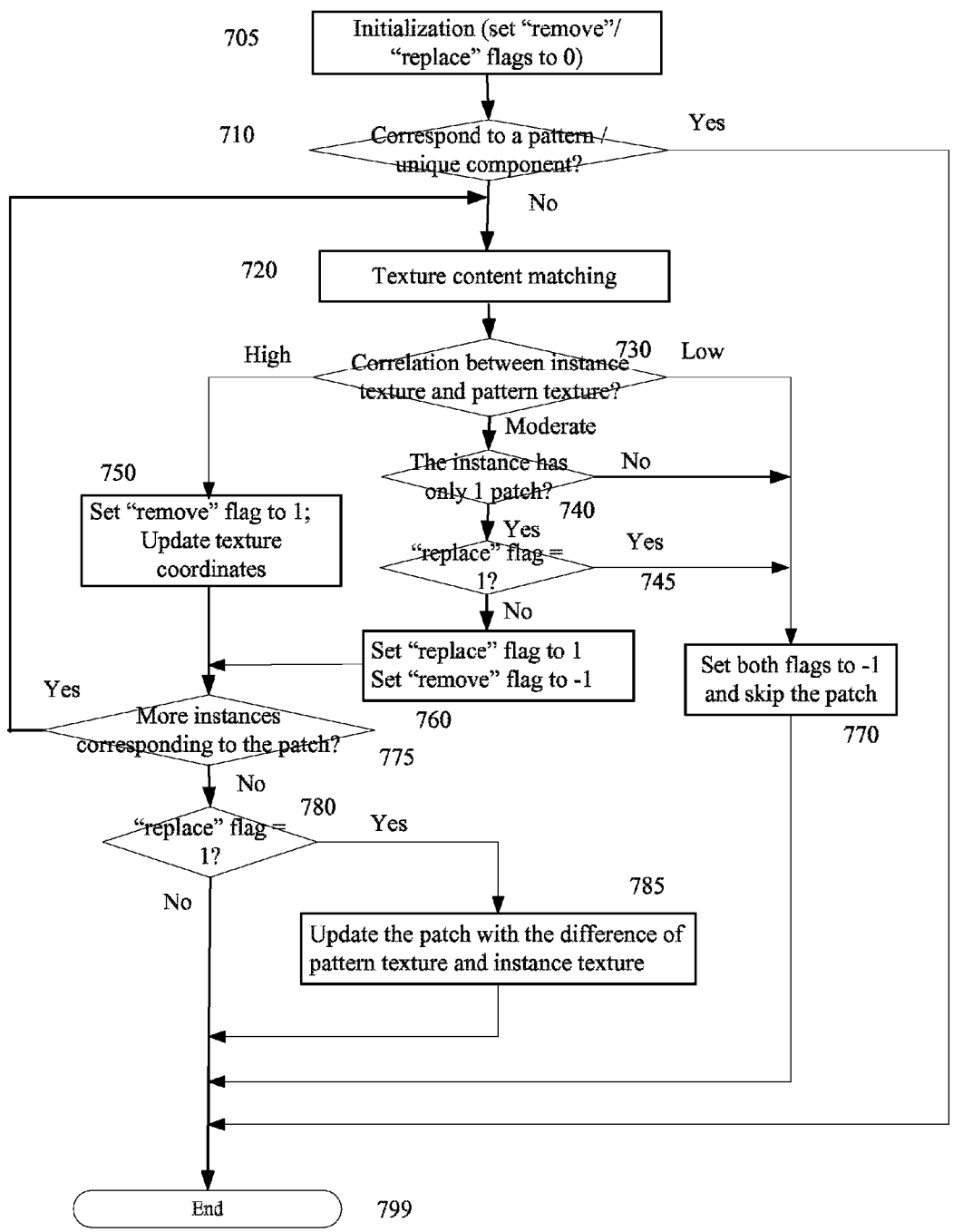
FIG. 7 is a flow diagram depicting an example for determining similarity of a texture patch for an instance with a corresponding texture patch for a pattern, in accordance with an embodiment of the present principles.

FIG. 7 illustrates an exemplary method 700 for determining the similarity of a texture patch for an instance with a corresponding texture patch for a pattern. Method 700 starts with an initialization step 705. The initialization step may divide texture images into a number of patches, each patch corresponding to a part of one or more components, whose IDs may be recorded. In method 700, we use a "remove" flag to indicate that a patch is identical or almost identical to the pattern for all instances, and use a "replace" flag to indicate that a patch is similar to the pattern. At the initialization step, both "remove" and "replace" flags are set to 0.

At step 710, it checks if the patch represents texture of a part of a pattern or unique component. If yes, the control is passed to an end step 799. Otherwise, method 700 proceeds to examine the texture patch and it checks every instance whose texture is (partly) represented by the patch.

At step 720, it compares the texture patch with the corresponding patch used by its pattern using a certain matching criteria, for example, mean square error (MSE). At step 730, it checks the correlation between the instance texture and the pattern texture. If the textures are highly correlated (e.g., MSE<threshold0), the instance texture is considered as identical or almost identical to the pattern texture, and it can be represented by the pattern texture. A "remove" flag is then set to 1 (i.e., the patch is tagged as to be removed) and the texture coordinates may be updated, for example, by translating the instance's texture coordinates according to the relative position between the instance texture and the pattern texture, at step 750. If the texture is moderately correlated (e.g., threshold0≤MSE<threshold1), it checks whether the instance has only one patch at step 740. If not, it goes to step 770. Otherwise, it checks whether a "replace" flag is 1 (i.e., the patch is tagged as to be replaced) at step 745. If yes, it goes to step 770. Otherwise, it sets "replace" flag to 1 and sets "remove" flag to −1. If the correlation between textures is low, (e.g., threshold1≤MSE), it goes to step 770.

At step 775, it checks whether there are more instances corresponding to the texture patch. If yes, the control is returned to step 720. Otherwise, when all instances using the patch are finished, it checks whether a "replace" flag is 1 at step 780. If yes, the patch is replaced with the difference between the pattern texture and the instance texture (785). Otherwise, the control is passed to end step 799.

There can be two alternative operations for a patch tagged as to be removed:

(1). The texture patch is physically removed from the texture images and texture coordinates are updated, and thus resulting in a smaller texture image. By removing some regions from the texture images, the size of the texture images can be reduced, and thus the texture images can be more efficiently compressed.

(2). The content of texture patch is voided, for example, every pixel in the patch is set to a certain color value (for example, black or gray).

Figure 8:
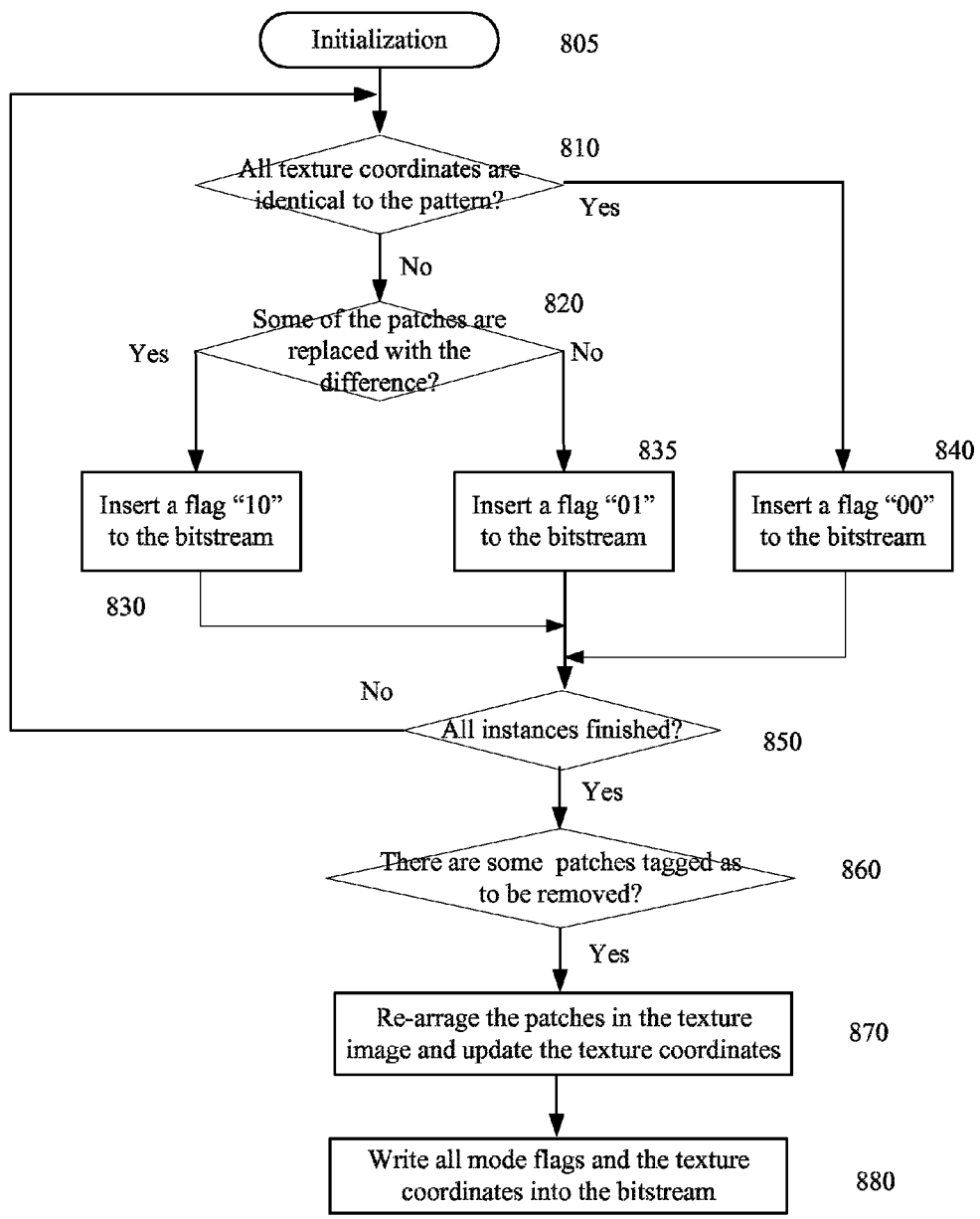
FIG. 8 is a flow diagram depicting an example for determining texture coding modes, in accordance with an embodiment of the present principles.

After individual patches are processed, we can decide whether texture for instances needs to be encoded, for example, as method 800 illustrated in FIG. 8. When a patch is removed or replaced, the corresponding texture coordinates are updated to the values for the texture patch of the pattern.

If all texture coordinates of an instance are identical to the pattern (810), it sets the mode flag to '00' (mode 1) at step 840, indicating that the pattern and the instance share textures. If some of the patches are replaced with difference (820), it sets the mode flag to '10' (mode 3) at step 830. Otherwise, it sets the mode flag to '01' (modes2 and 4) at step 835. It checks whether all instances are processed at step 850. At step 860, it checks whether any patch has a "remove" flag set to 1. If yes, patches are re-arranged in the texture image and texture coordinates of the entire 3D model are updated (870). The mode flag is signaled in the bitstream, and the texture coordinates are transmitted if the mode flag is not '00' (880). Note that different bit strings can be used to represent the mode.

Figure 9:
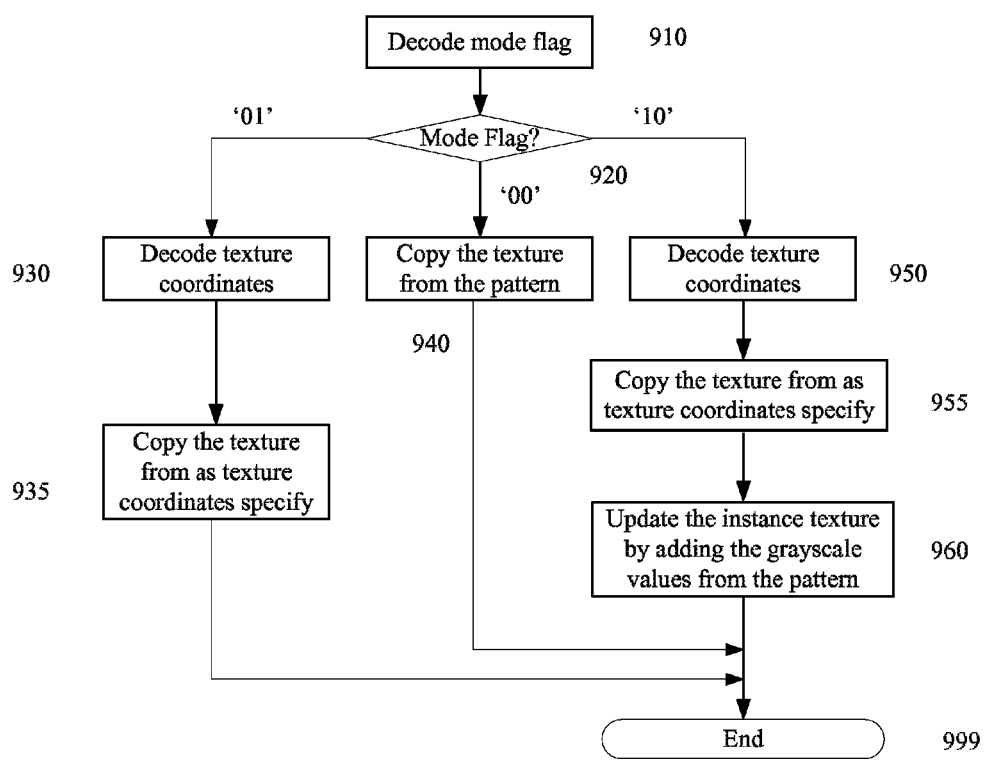
FIG. 9 is a flow diagram depicting an example for decoding a texture image, in accordance with an embodiment of the present principles.

FIG. 9 illustrates an exemplary method 900 for decoding the texture of the instances. For each instance, it decodes the mode flag at step 910. Then method 900 proceeds according to the mode flag (920).

If the mode flag is '00', it uses the texture of the pattern for the whole instance (940).

If the mode flag is '01', it decodes the texture coordinates at step 930 and finds the texture patch according to the decoded texture coordinates at step 935.

If the mode flag is '10', it decodes the texture coordinates at step 950 and it copies the texture image according to texture coordinates at step 955. Then it updates the instance texture by adding the texture image from the pattern at step 960. Method 900 ends at step 999.

Figure 10A:
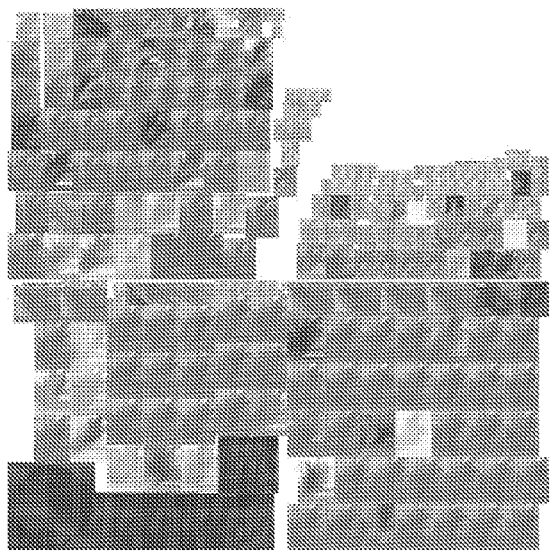
FIG. 10A is a pictorial example depicting a texture image.
Figure 10B:
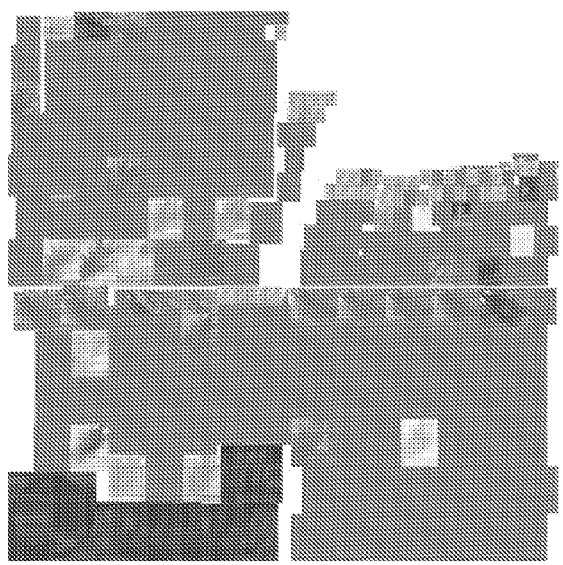
FIGS. 10B and 10C show pictorial examples depicting processed texture images, in accordance with an embodiment of the present principles.
Figure 10C:
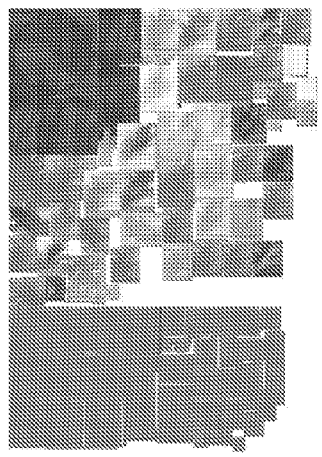

FIG. 10A is an exemplary texture image used as the input, and FIGS. 10B and 10C are exemplary texture images after processing, for example, using methods 700 and 800. In FIG. 10B, patches tagged to be removed is replaced with gray blocks. In FIG. 10C, patches tagged to be removed are physically removed from the texture image. As can be seen from FIG. 10B, there are many gray regions in the texture image which correspond to removed texture patches. In FIG. 10C, the patches are re-arranged, that is, the gray patches are removed, and remaining texture patches are put together, resulting in a much smaller texture image. In both cases, there is less information to be compressed, and thus, may improve the compression efficiency of the texture image.

In TABLE 3, exemplary syntax and semantics are illustrated for the present principles. For each instance, we indicate the compression mode of its texture, and the texture coordinate data if needed.

TABLE 3 compr_elem_insta_texture_header
compr_elem_insta_texcoord_data compr_elem_insta_texture_header is a mode flag. Its specific meaning is shown in TABLE 4. Note that the "share" mode corresponds to mode '00' in FIG. 9, the "no_pred" mode corresponds to mode '01' in FIG. 9, and the "texture_residual" mode corresponds to mode '10' in FIG. 9.

TABLE 4

| elem_insta_texCoord_compr_mode | Mode | Meaning |
| --- | --- | --- |
| 0 | share | The instance shares texture with the corresponding pattern. |
| 1 | ISO reserved | |
| 2 | no_pred | The instance has its specific texture coordinate data which is reconstructed by de-quantization and entropy decoding, without prediction. The texture of the reconstructed instance is to be obtained by decoding the texture coordinates from the bitstream and mapping the texture image portion indicated by the decoded texture coordinates. |
| 3 | texture_residual | The instance has its specific texture coordinate data which is reconstructed by de-quantization and entropy decoding, without prediction. The texture of the reconstructed instance is to be reconstructed by compensated mode using the texture of the corresponding pattern and the texture indicated by the reconstructed texture coordinates. | compr_elem_insta_texcoord_data includes all the texture coordinates of vertices if the mode is "no_pred" or "texture_residual." It shall be null if the mode is "share."

Figure 11:
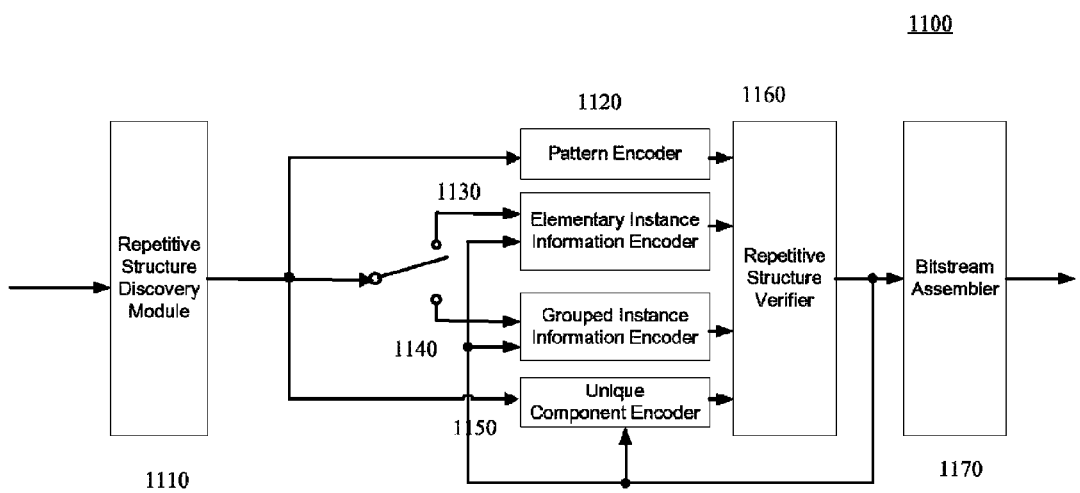
FIG. 11 is a block diagram depicting an example of an encoder that may be used with one or more implementations of the present principles.

FIG. 11 depicts a block diagram of an exemplary 3D model encoder 1100. In one embodiment, methods 700 and 800 may be used in encoder 1100. The input of apparatus 1100 may include a 3D model, quality parameter for encoding the 3D model and other metadata. The 3D model first goes through the repetitive structure discovery module 1110, which outputs the 3D model in terms of patterns, instances and unique components. A pattern encoder 1120 is employed to compress the patterns and a unique component encoder 1150 is employed to encode the unique components. For the instances, the instance component information is encoded based on a user-selected mode. If instance information group mode is selected, the instance information is encoded using grouped instance information encoder 1140; otherwise, it is encoded using an elementary instance information encoder 1130. The encoded components are further verified in the repetitive structure verifier 1160. If an encoded component does not meet its quality requirement, it will be encoded using unique component encoder 1150. Bitstreams for patterns, instances, and unique components are assembled at bitstream assembler 1170.

Figure 12:
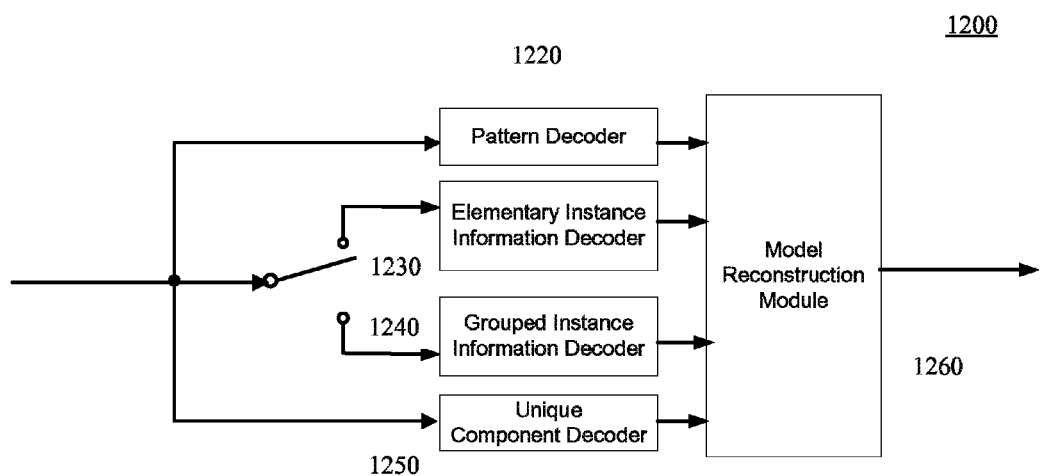
FIG. 12 is a block diagram depicting an example of a decoder that may be used with one or more implementations of the present principles.

FIG. 12 depicts a block diagram of an exemplary 3D model decoder 1200. In one embodiment, method 900 may be used in decoder 1200. The input of apparatus 1200 may include a bitstream of a 3D model, for example, a bitstream generated by methods 700 and 800. The information related to patterns in the compressed bitstream is decoded by pattern decoder 1220. Information related to unique components is decoded by unique component decoder 1250. The decoding of the instance information also depends on the user-selected mode. If instance information group mode is selected, the instance information is decoded using a grouped instance information decoder 1240; otherwise, it is decoded using an elementary instance information decoder 1230. The decoded patterns, instance information and unique components are reconstructed to generate an output decoded 3D model at model reconstruction module 1260.

Figure 13:
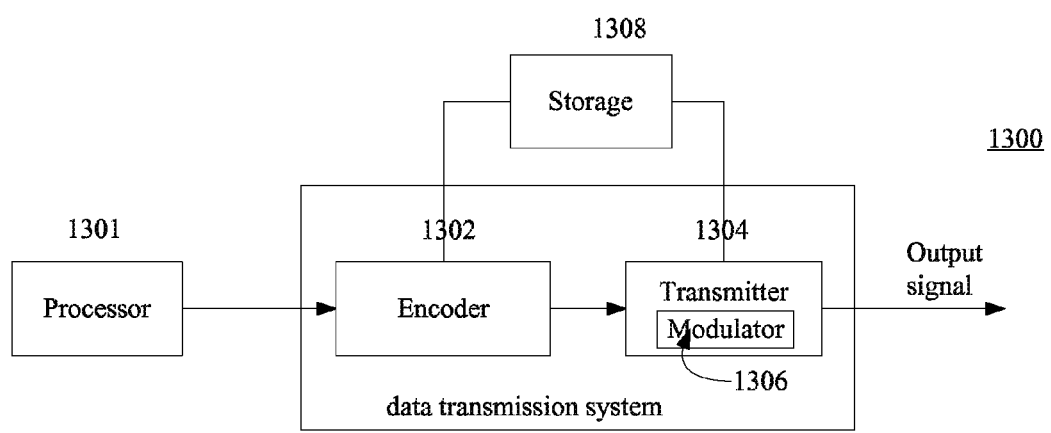
FIG. 13 is a block diagram depicting an example of a data processing system that may be used with one or more implementations of the present principles.

Referring now to FIG. 13, a data transmission system or apparatus 1300 is shown, to which the features and principles described above may be applied. The data transmission system or apparatus 1300 may be, for example, a head-end or transmission system for transmitting a signal using any of a variety of media, such as, for example, satellite, cable, telephone-line, or terrestrial broadcast. The data transmission system or apparatus 1300 also, or alternatively, may be used, for example, to provide a signal for storage. The transmission may be provided over the Internet or some other network. The data transmission system or apparatus 1300 is capable of generating and delivering, for example, video content and other content such as, for example, 3D models.

The data transmission system or apparatus 1300 receives processed data and other information from a processor 1301. In one implementation, the processor 1301 processes geometry data of 3D models to generate "pattern-instance" representation. The processor 1301 may also provide metadata to 1300 indicating, for example, the pattern ID and the transformation.

The data transmission system or apparatus 1300 includes an encoder 1302 and a transmitter 1304 capable of transmitting the encoded signal. The encoder 1302 receives data information from the processor 1301. The encoder 1302 generates an encoded signal(s).

The encoder 1302 may include sub-modules, including for example an assembly unit for receiving and assembling various pieces of information into a structured format for storage or transmission. The various pieces of information may include, for example, coded or uncoded video, and coded or uncoded elements such as, for example, substream length indicator, and syntax elements. In some implementations, the encoder 1302 includes the processor 1301 and therefore performs the operations of the processor 1301.

The transmitter 1304 receives the encoded signal(s) from the encoder 1302 and transmits the encoded signal(s) in one or more output signals. The transmitter 1304 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 1306. The transmitter 1304 may include, or interface with, an antenna (not shown). Further, implementations of the transmitter 1304 may be limited to the modulator 1306.

The data transmission system or apparatus 1300 is also communicatively coupled to a storage unit 1308. In one implementation, the storage unit 1308 is coupled to the encoder 1302, and stores an encoded bitstream from the encoder 1302. In another implementation, the storage unit 1308 is coupled to the transmitter 1304, and stores a bitstream from the transmitter 1304. The bitstream from the transmitter 1304 may include, for example, one or more encoded bitstreams that have been further processed by the transmitter 1304. The storage unit 1308 is, in different implementations, one or more of a standard DVD, a Blu-Ray disc, a hard drive, or some other storage device.

Figure 14:
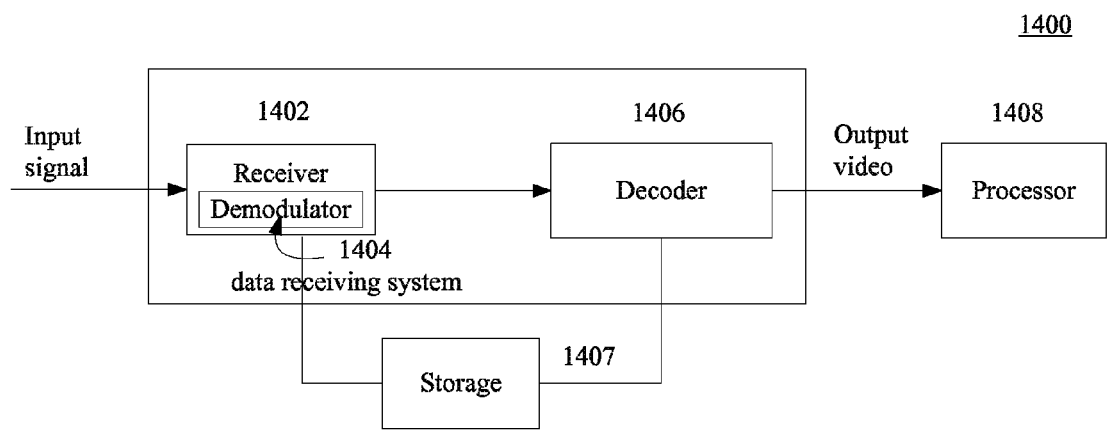
FIG. 14 is a block diagram depicting another example of a data processing system that may be used with one or more implementations of the present principles.

Referring now to FIG. 14, a data receiving system or apparatus 1400 is shown to which the features and principles described above may be applied. The data receiving system or apparatus 1400 may be configured to receive signals over a variety of media, such as, for example, storage device, satellite, cable, telephone-line, or terrestrial broadcast. The signals may be received over the Internet or some other network.

The data receiving system or apparatus 1400 may be, for example, a cell-phone, a computer, a set-top box, a television, or other device that receives encoded video and provides, for example, decoded video signal for display (display to a user, for example), for processing, or for storage. Thus, the data receiving system or apparatus 1400 may provide its output to, for example, a screen of a television, a computer monitor, a computer (for storage, processing, or display), or some other storage, processing, or display device.

The data receiving system or apparatus 1400 is capable of receiving and processing data information, and the data information may include, for example, 3D models. The data receiving system or apparatus 1400 includes a receiver 1402 for receiving an encoded signal, such as, for example, the signals described in the implementations of this application. The receiver 1402 may receive, for example, a signal providing one or more of the 3D models and/or texture images, or a signal output from the data transmission system 1200 of FIG. 12.

The receiver 1402 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 1404, de-randomizing the energy in the signal, de-interleaving the data in the signal, and error-correction decoding the signal. The receiver 1402 may include, or interface with, an antenna (not shown). Implementations of the receiver 1402 may be limited to the demodulator 1404.

The data receiving system or apparatus 1400 includes a decoder 1406. The receiver 1402 provides a received signal to the decoder 1406. The signal provided to the decoder 1406 by the receiver 1402 may include one or more encoded bitstreams. The decoder 1406 outputs a decoded signal, such as, for example, decoded video signals including video information. The decoder 1406 may be, for example, decoder 1200 described in FIG. 12.

The data receiving system or apparatus 1400 is also communicatively coupled to a storage unit 1407. In one implementation, the storage unit 1407 is coupled to the receiver 1402, and the receiver 1402 accesses a bitstream from the storage unit 1407. In another implementation, the storage unit 1407 is coupled to the decoder 1406, and the decoder 1406 accesses a bitstream from the storage unit 1407. The bitstream accessed from the storage unit 1407 includes, in different implementations, one or more encoded bitstreams. The storage unit 1407 is, in different implementations, one or more of a standard DVD, a Blu-Ray disc, a hard drive, or some other storage device.

The output data from the decoder 1406 is provided, in one implementation, to a processor 1408. The processor 1408 is, in one implementation, a processor configured for performing 3D model reconstruction. In some implementations, the decoder 1406 includes the processor 1408 and therefore performs the operations of the processor 1408. In other implementations, the processor 1408 is part of a downstream device such as, for example, a set-top box or a television.

We thus provide one or more implementations having particular features and aspects. In particular, we provide several implementations relating to 3D model encoding and decoding. 3D model encoding and decoding may allow a variety of applications, such as, for example, video gaming, virtual reality, and scientific visualization. However, variations of these implementations and additional applications are contemplated and within our disclosure, and features and aspects of described implementations may be adapted for other implementations.

Several of the implementations and features described in this application may be used in the context of the MPEG 3DGC Standard and its extensions. Additionally, these implementations and features may be used in the context of another standard (existing or future), or in a context that does not involve a standard.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for decoding a bitstream representing a 3D model comprising repetitive structures organized into patterns and instances, an instance being represented as a transformation of a corresponding pattern and a pattern being representative of a geometry of a repetitive structure of said 3D model, the method comprising:
   decoding from the bitstream a mode flag indicating whether an instance of a pattern uses texture coordinates of the pattern for determining texture coordinates of said instance; and
   when said mode flag indicates that said instance of the pattern uses texture coordinates of the pattern, determining texture coordinates of the instance using texture coordinates of the pattern,
   when said mode flag indicates that said instance of the pattern does not use texture coordinates of the pattern, decoding texture coordinates of the instance from said bitstream.

2. The method of claim 1, wherein when said mode flag indicates that said instance of the pattern does not use texture coordinates of the pattern, the method further comprises:
   determining from the bitstream a difference between a texture of the instance and a texture of the pattern, and
   updating the texture of said instance by adding the texture of the pattern.

3. A method for generating a bitstream representing a 3D model comprising repetitive structures organized into patterns and instances, an instance being represented as a transformation of a corresponding pattern and a pattern being representative of a geometry of a repetitive structure of said 3D model, the method comprising:
   accessing an instance of a pattern; and
   encoding in the bitstream a mode flag indicating whether an instance of a pattern uses texture coordinates of the pattern for determining texture coordinates of said instance.

4. The method of claim 3, wherein when said mode flag indicates that said instance of the pattern does not use texture coordinates of the pattern, the method further comprises:
   determining a difference between a texture of the instance and a texture of the pattern; and
   indicating said difference in the bitstream.

5. The method of claim 3, further comprising:
   determining a correlation between a texture patch of the instance with a corresponding texture patch of the pattern; and
   determining whether the texture patch of the instance is to be encoded using the corresponding texture patch of the pattern.

6. The method of claim 5, wherein the texture patch of the instance is removed from a texture image if the texture patch of the instance is determined to be identical or almost identical to the corresponding texture patch of the pattern.

7. The method of claim 5, wherein content of the texture patch of the instance is voided if the texture patch of the instance is determined to be identical or almost identical to the corresponding texture patch of the pattern.

8. The method of claim 5, wherein the texture patch of the instance is a region in a texture image that corresponds to a set of adjacent triangles on the 3D model.

9. The method of claim 3 further comprising:
   determining an order of vertices in a first face in a pattern associated with a structure;
   accessing a plurality of texture coordinates sets, wherein each texture coordinates set of the plurality of texture coordinates sets is associated with a corresponding vertex in a second face in an instance of the pattern; and
   ordering the plurality of texture coordinates sets in response to the determined order.

10. The method of claim 9, further comprising:
    determining the second face in the instance that corresponds to the first face in the pattern.

11. An apparatus for decoding a bitstream representing a 3D model comprising repetitive structures organized into patterns and instances, an instance being represented as a transformation of a corresponding pattern and a pattern being representative of a geometry of a repetitive structure of said 3D model, the apparatus comprising a memory associated with a processor configured to:
    decode from the bitstream a mode flag indicating whether an instance of a pattern uses texture coordinates of the pattern for determining texture coordinates of said instance; and
    when said mode flag indicates that said instance of the pattern uses texture coordinates of the pattern, determine texture coordinates of the instance using texture coordinates of the pattern, when said mode flag indicates that said instance of the pattern does not use texture coordinates of the pattern, decoding texture coordinates of the instance from said bitstream.

12. The apparatus of claim 11, wherein, when said mode flag indicates that said instance of the pattern does not use texture coordinates of the pattern, said processor is further configured to:
   determine from the bitstream a difference between a texture of the instance and a texture of the pattern, and
   update the texture of said instance by adding the texture of the pattern.

13. An apparatus for generating a bitstream representing a 3D model comprising repetitive structures organized into patterns and instances, an instance being represented as a transformation of a corresponding pattern and a pattern being representative of a geometry of a repetitive structure of said 3D model, the apparatus comprising:
   a processor configured to access an instance of a pattern; and
   an encoder configured to encode a mode flag in the bitstream indicating whether an instance of a pattern uses texture coordinates of the pattern for determining texture coordinates of said instance.

14. The apparatus of claim 13, wherein when said mode flag indicates that said instance of the pattern does not use texture coordinates of the pattern, the encoder is further configured to
   determine a difference between a texture of the instance and a texture of the pattern; and
   indicate said difference in the bitstream.

15. The apparatus of claim 13, wherein the encoder is further configured to
   determine a correlation between a texture patch of the instance with a corresponding texture patch of the pattern; and
   determine whether the texture patch of the instance is to be encoded using the corresponding texture patch of the pattern.

16. The apparatus of claim 15, wherein the texture patch of the instance is removed from a texture image if the texture patch of the instance is determined to be identical or almost identical to the corresponding texture patch of the pattern.

17. The apparatus of claim 15, wherein content of the texture patch of the instance is voided if the texture patch of the instance is determined to be identical or almost identical to the corresponding texture patch of the pattern.

* * * * *